United States Patent
Xu et al.

(10) Patent No.: US 10,896,018 B2
(45) Date of Patent: Jan. 19, 2021

(54) IDENTIFYING SOLUTIONS FROM IMAGES

(71) Applicant: SAP SE, Walldorf (DE)

(72) Inventors: Qi Xu, Hanzhou (CN); Yong Zhang, Shanghai (CN); Jianquan Ye, Jiangxi (CN); Han Wang, Shanghai (CN); Qianting Wang, Shanghai (CN)

(73) Assignee: SAP SE, Walldorf (DE)

( * ) Notice: Subject to any disclaimer, the term of this patent is extended or adjusted under 35 U.S.C. 154(b) by 75 days.

(21) Appl. No.: 16/406,162

(22) Filed: May 8, 2019

(65) Prior Publication Data
US 2020/0356334 A1 Nov. 12, 2020

(51) Int. Cl.
| | | |
|---|---|---|
| G06K 9/00 | (2006.01) |
| G06F 3/14 | (2006.01) |
| H04N 19/94 | (2014.01) |
| G06F 9/30 | (2018.01) |
| G06F 16/583 | (2019.01) |

(52) U.S. Cl.
CPC .......... G06F 3/1454 (2013.01); G06F 9/3004 (2013.01); G06F 16/583 (2019.01); H04N 19/94 (2014.11)

(58) Field of Classification Search
CPC .. G06F 3/1454; G06F 16/583; G06F 16/2246; G06F 16/3344; G06F 16/951; G06F 9/3004; G06F 9/453; G06F 11/079; G06F 11/0706; G06F 11/0709; G06F 11/0787; G06F 11/32; G06F 11/323; G06F 11/0751; G06F 11/0775; G06F 11/00; G06F 11/0793; G06F 40/20; H04N 19/94; G06K 9/6256; G06K 9/6269; G06Q 30/016; G06Q 30/01; G06Q 10/00; G06Q 10/06; G06Q 10/10; G06Q 10/20; G06Q 10/063114; G06Q 50/10; G06N 5/04; G06N 5/025; H04L 41/06; H04L 41/12; H04L 41/145; H04L 67/1095; H04L 67/18; H04W 24/00; H04W 24/04
See application file for complete search history.

(56) References Cited

U.S. PATENT DOCUMENTS

| | | | |
|---|---|---|---|
| 9,342,758 B2 | 5/2016 | Xu |
| 9,367,383 B2 | 6/2016 | Henley et al. |
| 9,406,023 B2 | 8/2016 | Bogojeska et al. |
| 2005/0273368 A1 | 12/2005 | Hutten et al. |
| 2006/0211404 A1* | 9/2006 | Cromp | G06Q 10/10 455/405 |

(Continued)

OTHER PUBLICATIONS

Mani et al., "Hi, how can I help you?: Automating enterprise IT support help desks," Cornell University, Nov. 2, 2017, 9 pages.

*Primary Examiner* — Jose L Couso
(74) *Attorney, Agent, or Firm* — Fish & Richardson P.C.

(57) ABSTRACT

Implementations of the present disclosure include receiving an image representing a screenshot associated with the incident occurring within the software system, processing the image to generate a vector, the vector including features representative of the image, at least one feature representing one of more keywords of the image, comparing the vector to a set of known vectors to provide a result, each known vector being associated with at least one solution for resolving a known incident, identifying a solution of a plurality of solutions based on the result, and transmitting data representation of the solution to a customer, the customer having transmitted the image.

17 Claims, 6 Drawing Sheets

(56) References Cited

U.S. PATENT DOCUMENTS

| | | |
|---|---|---|
| 2016/0055044 A1 | 2/2016 | Kawai et al. |
| 2017/0103329 A1 | 4/2017 | Reddy |
| 2018/0307756 A1* | 10/2018 | Garay .................... G06N 20/00 |
| 2019/0087746 A1* | 3/2019 | Jain ....................... G06Q 30/016 |
| 2019/0129823 A1* | 5/2019 | Pell ....................... G06F 11/079 |

* cited by examiner

| Runtime Error Long Text | |
|---|---|
| Editor | |
| Runtime Error | Category       Resource Shortage |
| System Environment | Runtime Errors  PAGE_NEW_ALLOC_FAIL |
| - System Environment | Date and Time  2019/12/31  17:33:45 |
| - User and Transaction | Short Text |
| - RFC Caller Information | Insufficient memory available to add rows to internal table. |
| User View | |
| - What happened? | What happened? |
| - What can you do? | An attempt was made to add rows to an internal table. There was not enough memory to do this. |
| Developer View | What can you do? |
| - Short Text | Note the actions and entries that caused the error to occur. |
| - Error Analysis | Contact the administrator. |
| - How to correct the error | View, manage, and retain termination messages for longer periods. |
| - Source Code Extract | If problem is due to bottleneck, run the transaction again. |
| ... | Ask the administrator to check the following profile parameters:<br>- qrst/roll_area (500.000 – 2.000.000) roll area per user and session<br>- qrst/roll_extn (5.000.000 – 50.000.000) available in extended memory |

| Runtime Error Long Text | | |
|---|---|---|
| Editor | | |
| Runtime Error | Category | Programming Error |
| System Environment | Runtime Errors | MOVE_ERROR |
| - System Environment | Exception | QR_MOVE_ERROR |
| - User and Transaction | Program | ST_UV_BKUP_REST |
| User View | App. Comp. | XYZ_APP1_TR |
| - What happened? | Date and Time | 2019/12/31 13:03:25 |
| - What can you do? | What can you do? | |
| Developer View | Note the actions and entries that caused the error to occur. | |
| - Short Text | Contact the administrator. | |
| - Error Analysis | Look at and manage termination messages and store them. | |
| - How to correct the error | Error Analysis | |
| - Source Code Extract | An exception occurred. The exception is assigned to the class "QR_MOVE_ERROR" and was not caught in procedure "PARSE_XML_DATA" "METHOD" or propagated by a RAISING clause. | |
| ... | Because the caller of the procedure could not anticipate this exception, the program was terminated. | |
| | The reason for the exception is: | |
| | - During the MOVE operation ('?=' or 'MOVE TO') an attempt was made to | |

302

IDENTIFYING SOLUTIONS FROM IMAGES

BACKGROUND

Some enterprises provide software systems to customers. In some instances, software systems enable customers to operate their own enterprises. Example software systems can include, without limitation, enterprise resource planning (ERP) systems, customer relationship management (CRM) systems, product lifecycle management (PLM) systems, supply chain management (SCM) systems, and supplier relationship management (SRM). In order for customers to operate efficiently, any incidents occurring with the software systems need to be addressed in a time- and resource-efficient manner.

To this end, enterprises provide incident management support to assist customers in resolving incidents. However, the process of helping customers to solve incidents can be time- and resource-consuming. For example, resolution of an incident can involve numerous communications with the customer to collect information about the incident, which can be used to resolve the incident. Not only do customers consume computing resources to gather such information, the back-forth communication consumes memory, computing resources, and bandwidth. For example, communications from customers may include descriptive text and attachments (e.g., images).

SUMMARY

Implementations of the present disclosure include computer-implemented methods for incident management in software systems. More particularly, implementations of the present disclosure are directed to identifying one or more solutions for resolving an incident based on an image.

In some implementations, actions include receiving an image representing a screenshot associated with the incident occurring within the software system, processing the image to generate a vector, the vector including features representative of the image, at least one feature representing one of more keywords of the image, comparing the vector to a set of known vectors to provide a result, each known vector being associated with at least one solution for resolving a known incident, identifying a solution of a plurality of solutions based on the result, and transmitting data representation of the solution to a customer, the customer having transmitted the image. Other implementations include corresponding systems, apparatus, and computer programs, configured to perform the actions of the methods, encoded on computer storage devices.

These and other implementations may each optionally include one or more of the following features: processing the image to generate a vector includes: providing the image for processing through an image model, the image model providing an initial set of features, each feature in the initial set of features being representative of the image, determining the at least one feature representing one of more keywords of the image, and adding the at least one feature of the initial set of features to provide a set of features, the vector including the set of features; the at least one feature representing one of more keywords of the image is determined by processing the image to provide text data, and processing the text data to determine a set of keywords, the at least one feature being provided based on the set of keywords; the at least one feature is determined as a numerical value based on one or more scores of keywords in the set of keywords; comparing the vector to a set of known vectors to provide a result comprises calculating a similarity score between the vector and each known vector in the set of known vectors to provide a set of similarity scores, each similarity score representing a similarity between the vector and a respective known vector; identifying a solution of a plurality of solutions based on the result includes identifying the solution as being associated with the known vector having a highest similarity score; and transmitting data representation of the solution to a customer comprises receiving solution data from a solution database, the solution data comprising one or more of text data, image data, audio data, and video data, and transmitting the solution data to a computing device of the customer.

The present disclosure also provides one or more non-transitory computer-readable storage media coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure may include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

FIGS. 3A and 3B depict example images.

Like reference symbols in the various drawings indicate like elements.

DETAILED DESCRIPTION

Figure 1:
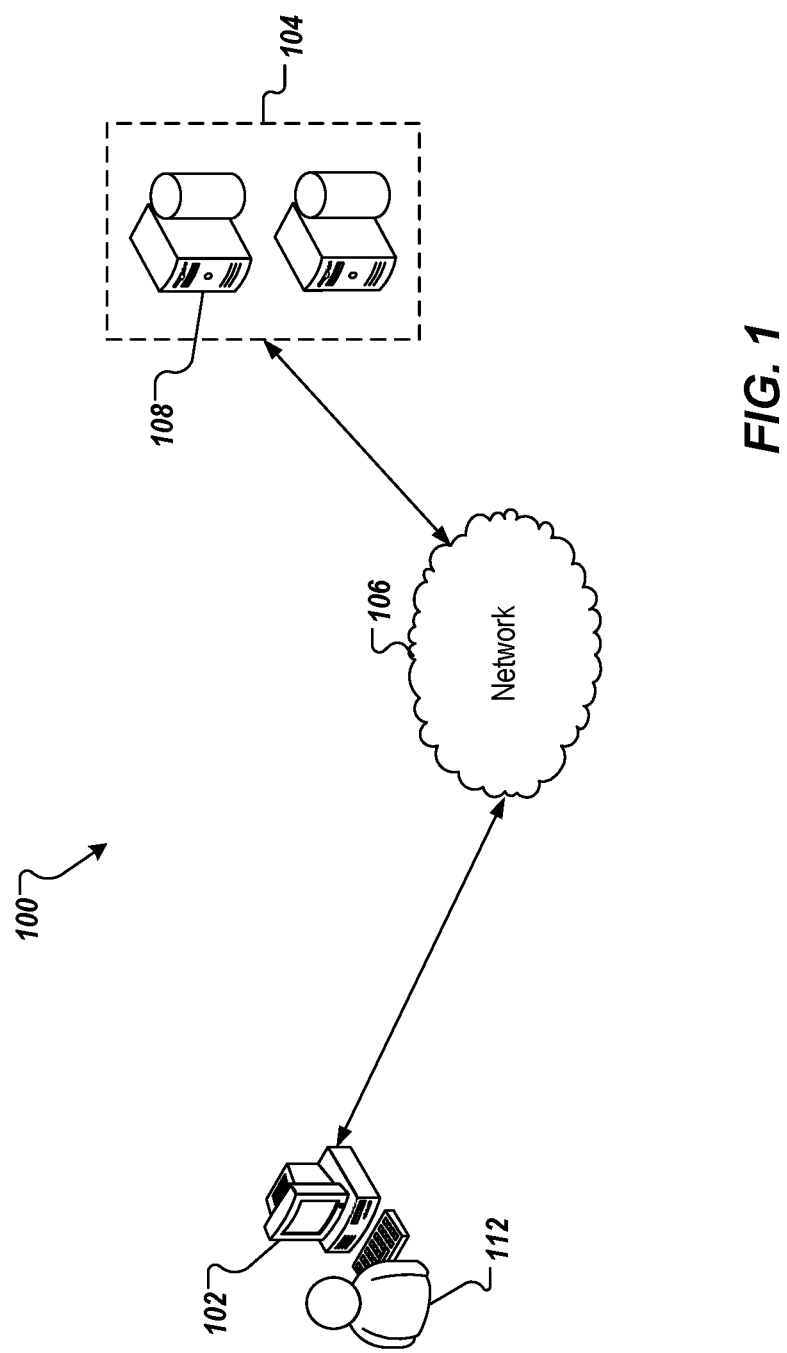
FIG. 1 depicts an example environment that can be used to execute implementations of the present disclosure.

Implementations of the present disclosure include computer-implemented methods for incident management in software systems. More particularly, implementations of the present disclosure are directed to identifying one or more solutions for resolving an incident based on an image. In some implementations, actions include receiving an image representing a screenshot associated with the incident occurring within the software system, processing the image to generate a vector, the vector including features representative of the image, at least one feature representing one of more keywords of the image, comparing the vector to a set of known vectors to provide a result, each known vector being associated with at least one solution for resolving a known incident, identifying a solution of a plurality of solutions based on the result, and transmitting data representation of the solution to a customer, the customer having transmitted the image.

To provide further context for implementations of the present disclosure, and as introduced above, enterprises can provide software systems to customers, which software systems enable customers to operate their own enterprises. Example software systems can include, without limitation, enterprise resource planning (ERP) systems, customer relationship management (CRM) systems, product lifecycle management (PLM) systems, supply chain management (SCM) systems, and supplier relationship management (SRM). In operating the software systems, incidents can occur that inhibit effective use of the software systems. An incident can be described as event that results in a loss of, or disruption to, an organization's operations, services or functions carried out through a software system.

In order for customers to operate efficiently, any incidents occurring with the software systems need to be addressed in a time- and resource-efficient manner. To this end, enterprises provide incident management support to assist customers in resolving incidents. Incident management generally refers to a process of identifying, analyzing, and resolving incidents to end disruption in operations, information security, IT systems, and the like. However, the process of helping customers to solve incidents, can be a time- and resource-consuming. For example, resolution of an incident can involve numerous communications with the customer to collect information about the incident, which can be used to resolve the incident. Not only do customers consume computing resources to gather such information, the back-forth communication consumes memory, computing resources, and bandwidth. For example, communications from customers may include descriptive text and attachments (e.g., images).

In view of this, implementations of the present disclosure are directed to computer-implemented methods for incident management in software systems. More particularly, implementations of the present disclosure are directed to identifying one or more solutions for resolving an incident based on an image. As described in further detail herein, a so-called image-to-solution (I2S) platform is provided, which processes an image to identify one or more solutions for resolving an incident.

In accordance with implementations of the present disclosure, historical incident data can be used to train an image model. For example, an enterprise can receive incident data associated with millions of incidents occurring each year. Such incident data typically includes digital images representative of a respective incident. An example image includes a screenshot of information displayed on a computing device. For example, a user can capture a screenshot of an interface displaying incident information as an image and can transmit the image to an enterprise in an effort to resolve the incident. In some examples, the enterprise can provide a solution to resolve the incident, at least partially in view of the image received. Consequently, the image can be associated with a solution that was used to resolve the incident. This image-solution pair can be provided as historical data that can be used to train an image model.

In some implementations, a solution can be provided as a set of data that represents resolution of a respective incident. In some examples, the set of data includes any appropriate type of data. Example types of data can include, without limitation, text data, image data, video data and audio data. For example, a solution can be provided as a set of data including text and images that describe and illustrate a process that can be performed for resolving a respective incident.

In some implementations, the image model is trained using a training technique. Example training techniques include supervised learning, unsupervised learning, and semi-supervised learning. For example, the historical incident data is can be used to provide labeled training data to enable supervised learning of the image model. Further detail of training is presently foregone. It is contemplated, however, that implementations of the present disclosure can be realized using any appropriate training technique. An example model can include, without limitation, a convolutional neural network (CNN). It is contemplated, however, that implementations of the present disclosure can be realized using any appropriate model as the image model.

For example, an image model can be provided using the SAP Leonardo Machine Learning Image Feature Extraction Service provided by SAP SE of Walldorf, Germany. In some examples, SAP Leonardo is used to identify valuable features from images, which can contain particular features (e.g., a specific display format for types of products). In some examples, an image model can be built with algorithm Oriented FAST and Rotated BRIE(ORB).

In response to an incident, and as described in further detail herein, a user transmits an image to the I2S platform of the present disclosure. The I2S platform processes the image through the image model, which provides a set of features representative of the image. The I2S platform also processes the image to extract a set of keywords including one or more keywords. The set of keywords is processed to provide a keyword feature that is included in the set of features provided from the image model. In some implementations, an image vector that is representative of the image is provided using the set of features, and that accounts for the one or more keywords. In some implementations, one or more solutions are identified based on the image vector, and are presented for resolution of the underlying incident.

As described herein, implementations of the present disclosure eliminate subjective differences of key information identification and ensure the objectivity of description for resolving incidents in software systems. For example, different users can have different understandings of issues based on their different background. However, images describe issues objectively. By identifying solutions based on images, implementations of the present disclosure significantly improve the accuracy of the proposed solution(s). Further, implementations of the present disclosure reduce the user input to a single submission of single data (i.e., an image). This not only improves the support process, but reduces the burden on technical resources.

FIG. 1 depicts an example architecture 100 in accordance with implementations of the present disclosure. In the depicted example, the example architecture 100 includes a client device 102, a network 106, and a server system 104. The server system 104 includes one or more server devices and databases 108 (e.g., processors, memory). In the depicted example, a user 112 interacts with the client device 102.

In some examples, the client device 102 can communicate with the server system 104 over the network 106. In some examples, the client device 102 includes any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, the server system 104 includes at least one server and at least one data store. In the example of FIG. 1, the server system 104 is intended to represent various forms of servers including, but not limited to a web server, an application server, a proxy server, a network server, and/or a server pool. In general, server systems accept requests for application services and provides such services to any number of client devices (e.g., the client device 102 over the network 106).

In accordance with implementations of the present disclosure, the server system 104 can host an I2S platform that provides one or more solutions for resolving incidents based on a received image. For example, the user 112 can submit an image to the I2S platform, the image visually representing an incident that the user 112 is seeking to resolve. An example image includes a screen-shout that includes data (e.g., text, image(s)) that is representative of the incident. In accordance with implementations of the present disclosure, the I2S platform processes the image to provide one or more solutions that can be used to resolve an incident represented by the image.

Figure 2:
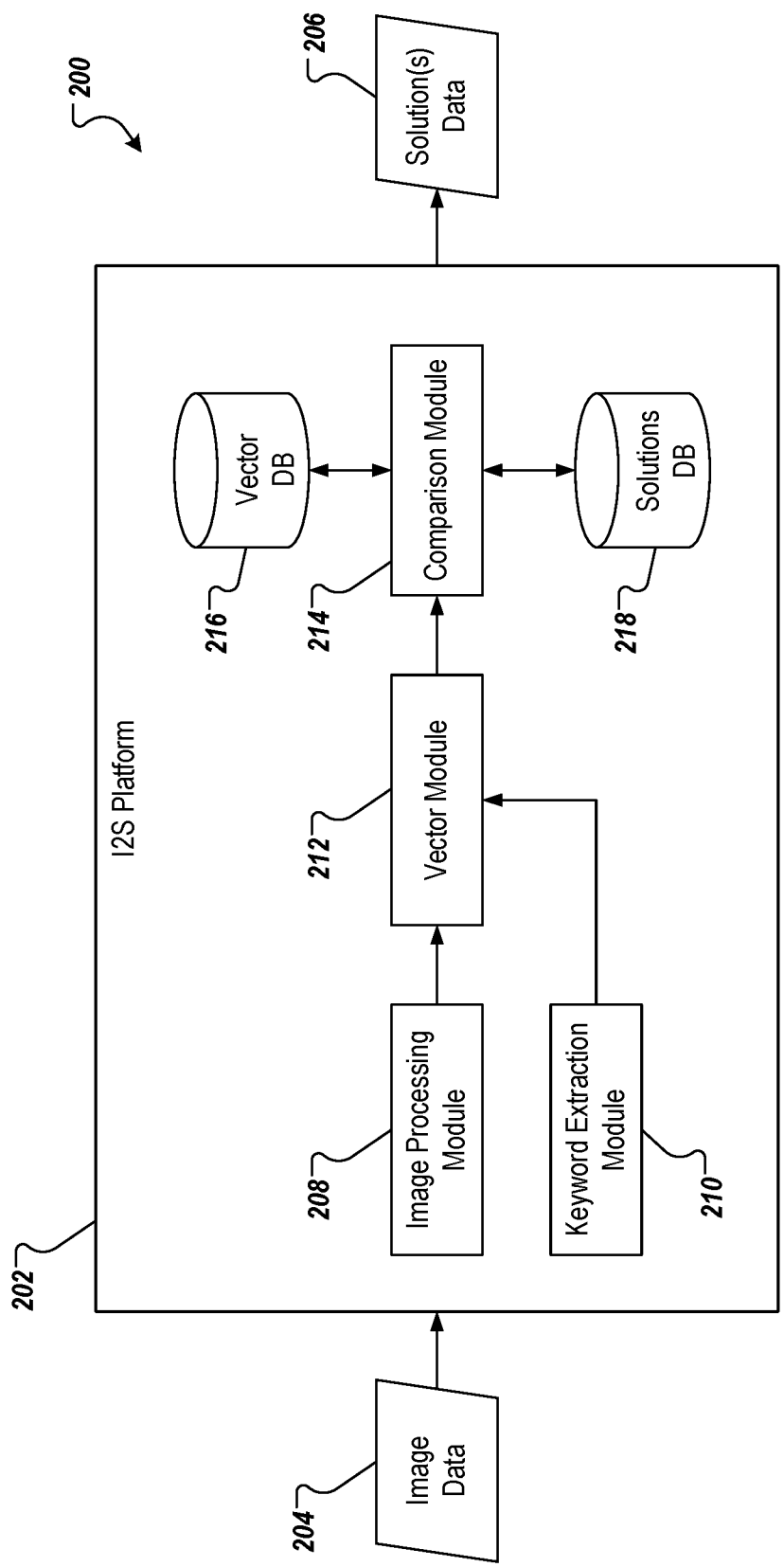
FIG. 2 depicts an example conceptual architecture in accordance with implementations of the present disclosure.

FIG. 2 depicts an example conceptual architecture 200 in accordance with implementations of the present disclosure. The example conceptual architecture 200 includes an I2S platform 202 in accordance with implementations of the present disclosure. As described in further detail herein, the I2S platform 202 receives an image 204, and processes the image 204 to provide solutions data 206. In some examples, the image 204 is provided as an image file (e.g., .jpg, .bmp, .gif) that includes data representative of the image 204 (e.g., a screen-shot). In some examples, the solutions data 206 includes data representative of one or more solutions that can be implemented to resolve the incident.

FIGS. 3A and 3B depict example images. FIG. 3A depicts an image 300 representative of a first incident occurring within a software system, and FIG. 3B depicts an image 302 representative of a second incident occurring within a software system. Visually, the image 300 looks similar to the image 302, which, at a quick glance, suggests similarities between the two. However, a detailed comparison of the image 300 to the image 302 reveals a significant disparity in the underlying incidents. For example, the image 300 represents an error log that is generated is response to a resource shortage (e.g., insufficient memory), while the image 302 represents an error log that is generated in response to a programming error (e.g., an exception being raised).

Referring again to FIG. 2, in the depicted example, the I2S platform 202 includes an image processing module 208, a keyword extraction module 210, a vector module 212, and a comparison module 214. In some examples, each of the modules 208, 210, 212, 214 is provided as one or more computer-executable programs. In some examples, although individual modules 208, 210, 212, 214 are depicted, implementations of the present disclosure can be realized using fewer modules (e.g., a module that executes the functionality of two or more of the modules 208, 210, 212, 214) or more modules (e.g., functionality of one or more of the modules 208, 210, 212, 214 being provided by multiple modules).

In the example of FIG. 2, the I2S platform 202 includes a known vector database (DB) 216 and a solutions DB 218. In some examples, the known vector DB 216 stores known vectors that represent respective images associated with previously submitted incidents and one or more solutions that had been implemented to resolve respective incidents. In some examples, each known vector in the known vector DB 216 is associated with one or more identifiers, each identifier identifying a solution. For example, the known vector DB 216 stores known vector—solution tuples that each associate a known vector to a solution. An example tuple can include $[KV_1, S_X]$, where $KV_1$ is, or otherwise identifies a first known vector (e.g., of an image identified as Image-1), and $S_X$ is an identifier indicating a solution (e.g., Solution-X) that had previously been executed to resolve an incident represented by $KV_1$.

In accordance with implementations of the present disclosure, each known vector is at least partially generated by the image model and is provided as a vector of features that represent an image, the image representative of an incident. In some examples, a feature (F) can be described as an individual measurable property or characteristic of an image. More plainly stated a feature represents a signature, or property of an image. Features extracted from images can be compared to differentiate between images or identify similar images, as described in further detail herein. An example table of known vectors can be provided as:

TABLE 1

Example Known Vectors

| Image | $F_1$ | $F_2$ | ... | $F_m$ | Solution(s) |
|---|---|---|---|---|---|
| Image-1 | 0.02 | 0.13 | ... | 0.07 | Solution-X |
| Image-2 | 0.11 | 0.63 | ... | 0.29 | Solution-Y |
|  |  |  | ... |  |  |
| Image-n | 0.23 | 0.33 | ... | 0.08 | Solution-Z |

In some examples, at least one feature of each image is provided based on one or more keywords represented within the image. For example, an image can be processed (e.g., using natural language processing (NLP)) to identify a set of keywords within the image. In some examples, a feature and corresponding feature value is provided based on the set of keywords and is included in the known vector of the respective image. Extraction of keywords is described in further detail herein.

In some implementations, the solutions DB 218 stores multiple solutions that have each been implemented to resolve incidents. In some examples, the solutions DB 218 stores a solution as a set of data with a solution identifier (e.g., $S_X$) associated therewith. As introduced above, a set of data for a particular solution can include the set of data includes any appropriate type of data. Example types of data can include, without limitation, text data, image data, video data and audio data. For example, a solution can be provided as a set of data including text and images that describe and illustrate a process that can be performed for resolving a respective incident. By way of non-limiting example, a set of data for Solution-X ($S_X$) can include $[T_X, I_X, V_X]$, where $T_X$ is text describing the solution, $I_X$ is an image representative of a solution, and $V_X$ is a video describing execution of the solution. By way of another non-limiting example, a set of data for Solution-Y ($S_Y$) can include [$T_Y$], where $T_Y$ is text describing the solution.

In accordance with implementations of the present disclosure, the image data 204 is processed by the image processing module 208 to provide an initial set of features (e.g., $\{F_1, \ldots, F_{m-1}\}$) representative of the image data 204. For example, the image data 204 is processed through the image model, which provides the initial set of features as output. In some examples, the number of features in the initial set of features can be predetermined (e.g., as part of development and training of the image model). In some examples, the number of features represents a dimensionality, where a lower dimension (e.g., lower number of features) less accurately represents the image, but is easier to process, while a higher dimension (e.g., higher number of features) more accurately represents the image, but is harder to process. In some examples, the number of features can range between twenty and thirty features.

In some examples, each feature is representative of some aspect of the image and is provided as a numerical value. By way of non-limiting example, features can be generated based on pixels of an image, patterns within the image (e.g., locations/sizes of text boxes), color of the image (and/or individual pixels), and brightness of the image (and/or individual pixels). In some examples, the image model processes the image data to provide the values of the features.

In some implementations, the image data 204 is also processed by the keyword extraction module 210, which provides a set of keywords from the image data 204. In some examples, the keyword extraction module 210 processes the image data 204 using optical character recognition (OCR) to provide text data from the image data 204. In some examples, the text data is processed to provide the set of keywords. For example, the text data can be processed for data cleaning, which can include removing one or more words (e.g., stop words) to provide a set of words (e.g., remaining words that have potential to be a keyword). In some examples, a score is determined for each word in the set of words. An example score includes a term frequency-inverse document frequency (TF-IDF) score (also referred to as a weight), which can be described as a numerical statistic that represents a relative importance of a word in a document in a collection of documents. In some examples, for each word in the set of words, a TF-IDF score is determined. In some examples, the collection of documents is provided from historical images and header information of historical incidents, where OCR is used to provide text data from image data.

In some examples, each score is compared to a threshold score to determine whether a respective word is a keyword. For example, if the score of a word meets or exceeds (e.g., is greater than or equal to) the threshold score, the respective word is determined to be a keyword and is included in a set of keywords. If the score of a word does not meet or exceed (e.g., is not greater than or equal to) the threshold score, the respective word is determined to not be a keyword and is not included in the set of keywords.

In some implementations, the set of keywords is processed to provide a feature (e.g., $F_m$). In some examples, a value of the feature can be determined based on the TF-IDF scores of the keywords in the set of keywords. For example, the value can be provided as an average or a sum of the TF-IDF scores. In some examples, TextRank or LDA can be used to determine a value of the feature.

In some implementations, the initial set of features is provided from the image processing module 208 to the vector module 212, and the feature is provided from the keyword extraction module 210 to the vector module 212. In some examples, the feature is added to the initial set of features (e.g., $\{F_1, \ldots, F_{m-1}\}$) to provide a set of features (e.g., $\{F_1, \ldots, F_m\}$). In this manner, the set of features includes both features extracted from the image data 204 using the image model, and a feature representative of one or more keywords extracted from the image data 204. In some examples, the set of features defines an image vector that is representative of the image data 204. An example image vector can be provided as:

TABLE 2

| Example Image Vector | | | | |
| --- | --- | --- | --- | --- |
| Image | $F_1$ | $F_2$ | ... | $F_m$ |
| Image-New | 0.66 | 0.21 | ... | 0.58 |

In some implementations, the vector module 212 provides the image vector to the comparison module 214. In some examples, the comparison module 214 compares the image vector to known vectors of the known vector DB 216. In some examples, the image vector is compared to known vectors in an effort to identify at least one known vector that is determined to be sufficiently similar to the image vector. In further detail, the image vector can be compared to each known vector (or a sub-set of known vectors) and a similarity score can be provided for each image vector (IV)—known vector (KV) pair. For example, for known vectors $KV_1, \ldots, KV_n$ (e.g., corresponding to images 1, ..., n, respectively), the following example similarity scores (S) can be provided:

TABLE 3

| Example Similarity Scores | |
| --- | --- |
| IV-$KV_1$ | $S_1$ |
| IV-$KV_2$ | $S_2$ |
| ... | ... |
| IV-$KV_n$ | $S_n$ |

In some implementations, each similarity score is determined as one of a Euclidean distance and a Kullback-Leibler divergence (KLD). In some implementations, each similarity score can be compared to a threshold similarity score to determine whether a respective KV is sufficiently similar to the IV. In some examples, if a similarity score meets or exceeds (e.g., is greater than or equal to) the threshold similarity score, the respective KV is determined to be sufficiently similar to the IV. In some examples, if a similarity score does not meet or exceed (e.g., is not greater than or equal to) the threshold similarity score, the respective KV is determined not to be sufficiently similar to the IV.

In some examples, a single KV can be determined to be sufficiently similar to the IV (e.g., similarity scores of all other KVs do not meet or exceed the threshold similarity score). In some examples, multiple KVs can be determined to be sufficiently similar to the IV (e.g., similarity scores of multiple KVs meet or exceed the threshold similarity score). In some examples, a single KV can be selected from the multiple KVs. For example, the KV having the highest similarity score can be selected (e.g., MAX [$S_1, S_2, \ldots, S_n$]).

In some implementations, for a KV that is determined to be sufficiently similar to the IV, solution data is retrieved from the solutions DB 218. For example, and as described above, each KV is associated with at least one solution (e.g., a solution identifier). Solution data for the solution can be retrieved from the solutions DB 218 based on the solution identifier. The solution data is output from the I2S platform 202 as the solution data 206. In some examples, the solution data 206 can correspond to a single solution (e.g., a single KV was determined to be sufficiently similar to the IV, or a single KV was selected from multiple KVs). In some examples, the solution data 206 can correspond to multiple solutions (e.g., multiple KVs were determined to be sufficiently similar to the IV).

Figure 4:
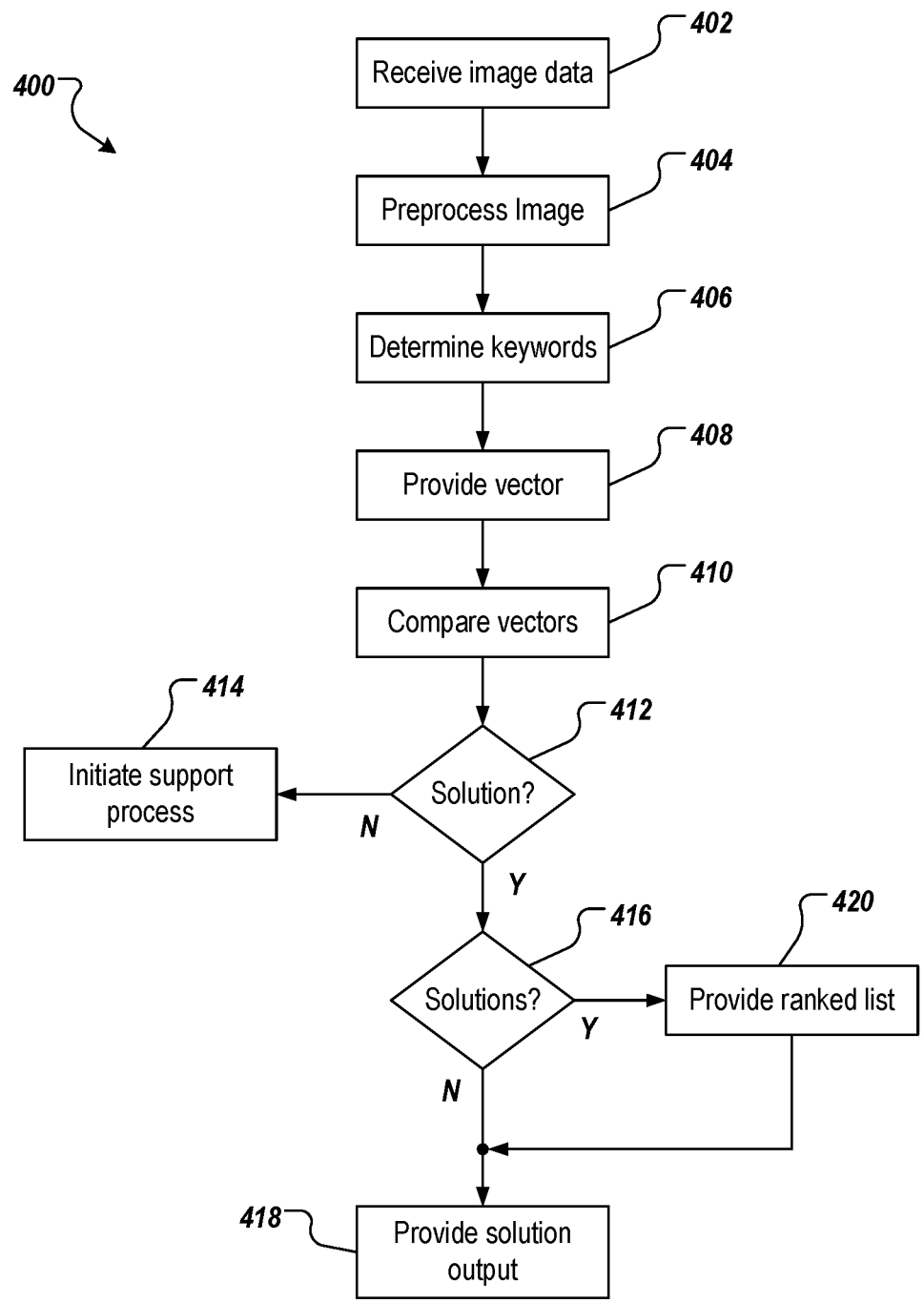
FIG. 4 depicts an example process that can be executed in accordance with implementations of the present disclosure.

FIG. 4 depicts an example process 400 that can be executed in accordance with implementations of the present disclosure. In some implementations, the example process 400 may be performed using one or more computer-executable programs executed using one or more computing devices. The example process 400 can be performed for resolving an incident associated with a software system.

An image is received (402). For example, the I2S platform 202 of FIG. 2 hosted by the server system 104 of FIG. 1 receives an image as the image data 204 from the computing device 102, the image being submitted by the user 112. In some examples, an incident results in a screen (e.g., error log) being displayed to the user 112 on the computing device 102, the user 112 generates the image as a screenshot of the screen. In some examples, the user 112 accesses the I2S platform through a graphical user interface (GUI) that enables submission of the image data 204.

The image is preprocessed (404). In some examples, the image is preprocessed to determine text data from the image. For example, and as described herein, the keyword extraction module 210 processes the image data 204 using OCR to provide text data from the image data 204. One or more keywords are determined from the image (406). For example, the text data provided from the image data 204 is processed to provide the set of keywords, as described herein. For example, the text data can be processed for data cleaning, which can include removing one or more words (e.g., stop words) to provide a set of words (e.g., remaining words that have potential to be a keyword). In some examples, a score is determined for each word in the set of words, and each score is compared to a threshold score to determine whether a respective word is a keyword.

An image vector is provided (408). For example, and as described herein, the image data 204 is processed by the image processing module 208 to provide an initial set of features (e.g., $\{F_1, \ldots, F_{m-1}\}$) representative of the image data 204, and the set of keywords is processed to provide a feature (e.g., $F_m$). In some examples, the initial set of features is provided from the image processing module 208 to the vector module 212, and the feature is provided from the keyword extraction module 210 to the vector module 212. In some examples, the feature is added to the initial set of features (e.g., $\{F_1, \ldots, F_{m-1}\}$) to provide a set of features (e.g., $\{F_1, \ldots, F_m\}$). In this manner, the set of features includes both features extracted from the image data 204 using the image model, and a feature representative of one or more keywords extracted from the image data 204.

The image vector is compared to known vectors in a set of known vectors (410). For example, and as described herein, the comparison module 214 compares the image vector to known vectors of the known vector DB 216 in an effort to identify at least one known vector that is determined to be sufficiently similar to the image vector. In some examples, a similarity score can be provided for each image vector (IV)—known vector (KV) pair, and each similarity score can be compared to a threshold similarity score to determine whether a respective KV is sufficiently similar to the IV.

It is determined whether a solution is identified based on the comparison (412). For example, if a KV is determined to be sufficiently similar to the IV it can be determined that a solution is identified. If no KV is determined to be sufficiently similar to the IV it can be determined that a solution is not identified. If a solution is not identified, a support process is initiated (414). For example, the user 112 can be placed in communication (e.g., audio, video, messaging, email) with a specialist that can work with the user 112 to gather information and identify a solution to the incident.

If a solution is identified, it is determined whether multiple solutions have been identified (416). If multiple solutions have not been identified, the solution is provided as output (418). For example, and as described herein, a set of data for a solution (S) can include [T, I, V], where T is text describing the solution, I is an image representative of a solution, and V is a video describing execution of the solution. In some examples, the solution is displayed to the user 112 in the GUI. If multiple solutions have been identified, a ranked list of solutions is provided (420). For example, solutions can be ranked based on similarity scores of the respective KVs to the IV. In some examples, a single solution can be determined from the ranked list (e.g., the solution associated with the KV having the highest similarity score to the IV) and can be provided as output. In some examples, multiple solutions can be determined from the ranked list (e.g., the solutions associated with the KVs having the X highest similarity scores to the IV) and can be provided as output.

Figure 5:
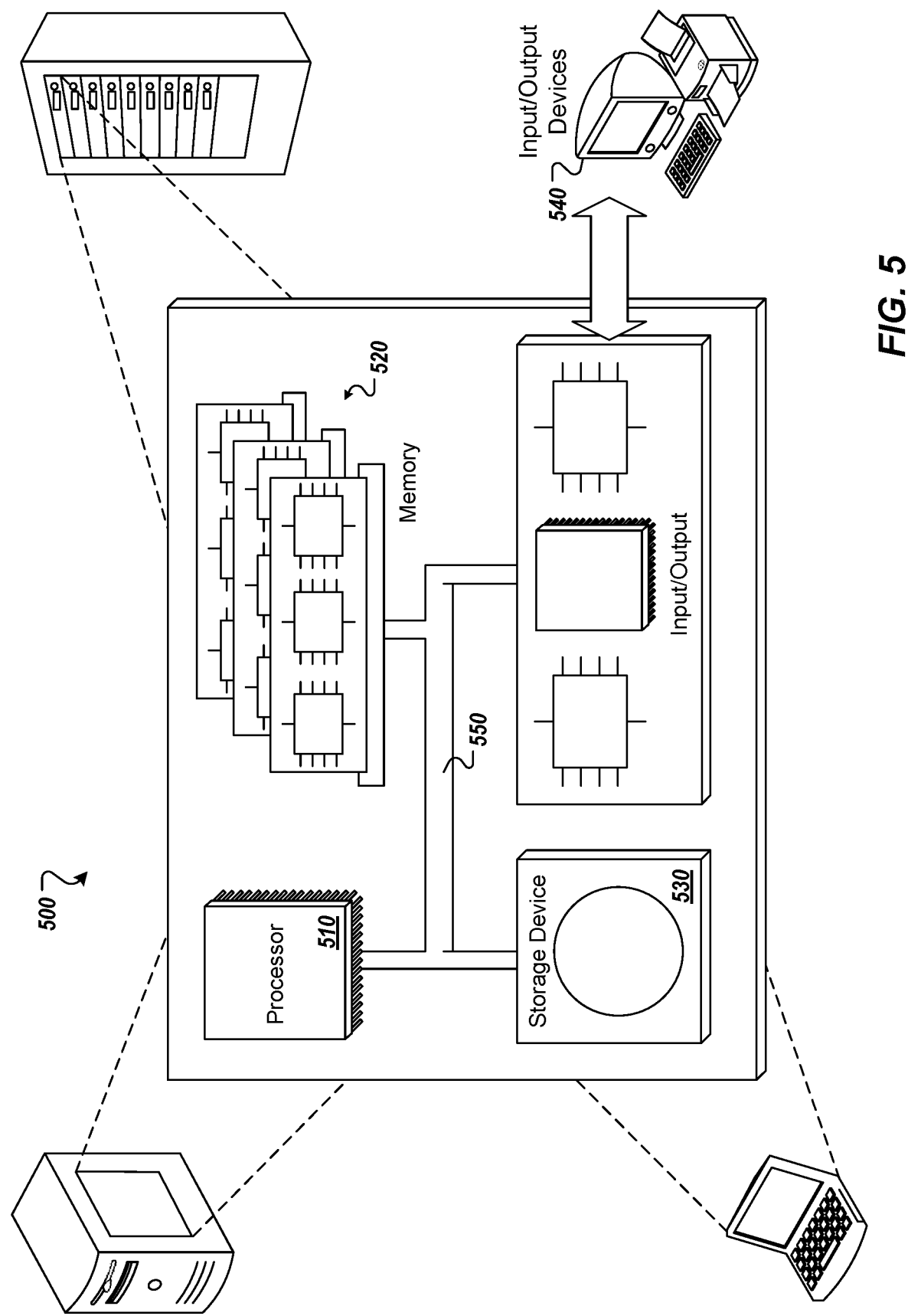
FIG. 5 is a schematic illustration of example computer systems that can be used to execute implementations of the present disclosure.

Referring now to FIG. 5, a schematic diagram of an example computing system 500 is provided. The system 500 can be used for the operations described in association with the implementations described herein. For example, the system 500 may be included in any or all of the server components discussed herein. The system 500 includes a processor 510, a memory 520, a storage device 530, and an input/output device 540. The components 510, 520, 530, 540 are interconnected using a system bus 550. The processor 510 is capable of processing instructions for execution within the system 500. In some implementations, the processor 510 is a single-threaded processor. In some implementations, the processor 510 is a multi-threaded processor. The processor 510 is capable of processing instructions stored in the memory 520 or on the storage device 530 to display graphical information for a user interface on the input/output device 540.

The memory 520 stores information within the system 500. In some implementations, the memory 520 is a computer-readable medium. In some implementations, the memory 520 is a volatile memory unit. In some implementations, the memory 520 is a non-volatile memory unit. The storage device 530 is capable of providing mass storage for the system 500. In some implementations, the storage device 530 is a computer-readable medium. In some implementations, the storage device 530 may be a floppy disk device, a hard disk device, an optical disk device, or a tape device. The input/output device 540 provides input/output operations for the system 500. In some implementations, the input/output device 540 includes a keyboard and/or pointing device. In some implementations, the input/output device 540 includes a display unit for displaying graphical user interfaces.

Implementations of the subject matter and the actions and operations described in this specification can be implemented in digital electronic circuitry, in tangibly-embodied computer software or firmware, in computer hardware, including the structures disclosed in this specification and their structural equivalents, or in combinations of one or more of them. Implementations of the subject matter described in this specification can be implemented as one or more computer programs, e.g., one or more modules of computer program instructions, encoded on a computer program carrier, for execution by, or to control the operation of, data processing apparatus. The carrier may be a tangible non-transitory computer storage medium. Alternatively, or in addition, the carrier may be an artificially-generated propagated signal, e.g., a machine-generated electrical, optical, or electromagnetic signal, that is generated to encode information for transmission to suitable receiver apparatus for execution by a data processing apparatus. The computer storage medium can be or be part of a machine-readable storage device, a machine-readable storage substrate, a random or serial access memory device, or a combination of one or more of them. A computer storage medium is not a propagated signal.

The term "data processing apparatus" encompasses all kinds of apparatus, devices, and machines for processing data, including by way of example a programmable processor, a computer, or multiple processors or computers. Data processing apparatus can include special-purpose logic circuitry, e.g., an FPGA (field programmable gate array), an ASIC (application-specific integrated circuit), or a GPU (graphics processing unit). The apparatus can also include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, an engine, a script, or code, can be written in any form of programming language, including compiled or interpreted languages, or declarative or procedural languages; and it can be deployed in any form, including as a stand-alone program or as a module, component, engine, subroutine, or other unit suitable for executing in a computing environment, which environment may include one or more computers interconnected by a data communication network in one or more locations.

A computer program may, but need not, correspond to a file in a file system. A computer program can be stored in a portion of a file that holds other programs or data, e.g., one or more scripts stored in a markup language document, in a single file dedicated to the program in question, or in multiple coordinated files, e.g., files that store one or more modules, sub-programs, or portions of code.

The processes and logic flows described in this specification can be performed by one or more computers executing one or more computer programs to perform operations by operating on input data and generating output. The processes and logic flows can also be performed by special-purpose logic circuitry, e.g., an FPGA, an ASIC, or a GPU, or by a combination of special-purpose logic circuitry and one or more programmed computers.

Computers suitable for the execution of a computer program can be based on general or special-purpose microprocessors or both, or any other kind of central processing unit. Generally, a central processing unit will receive instructions and data from a read-only memory or a random access memory or both. Elements of a computer can include a central processing unit for executing instructions and one or more memory devices for storing instructions and data. The central processing unit and the memory can be supplemented by, or incorporated in, special-purpose logic circuitry.

Generally, a computer will also include, or be operatively coupled to receive data from or transfer data to one or more mass storage devices. The mass storage devices can be, for example, magnetic, magneto-optical, or optical disks, or solid state drives. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

To provide for interaction with a user, implementations of the subject matter described in this specification can be implemented on, or configured to communicate with, a computer having a display device, e.g., a LCD (liquid crystal display) monitor, for displaying information to the user, and an input device by which the user can provide input to the computer, e.g., a keyboard and a pointing device, e.g., a mouse, a trackball or touchpad. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser, or by interacting with an app running on a user device, e.g., a smartphone or electronic tablet. Also, a computer can interact with a user by sending text messages or other forms of message to a personal device, e.g., a smartphone that is running a messaging application, and receiving responsive messages from the user in return.

This specification uses the term "configured to" in connection with systems, apparatus, and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions. For special-purpose logic circuitry to be configured to perform particular operations or actions means that the circuitry has electronic logic that performs the operations or actions.

While this specification contains many specific implementation details, these should not be construed as limitations on the scope of what is being claimed, which is defined by the claims themselves, but rather as descriptions of features that may be specific to particular implementations. Certain features that are described in this specification in the context of separate implementations can also be realized in combination in a single implementation. Conversely, various features that are described in the context of a single implementations can also be realized in multiple implementations separately or in any suitable subcombination. Moreover, although features may be described above as acting in certain combinations and even initially be claimed as such, one or more features from a claimed combination can in some cases be excised from the combination, and the claim may be directed to a subcombination or variation of a sub combination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the implementations described above should not be understood as requiring such separation in all implementations, and it should be understood that the described program components and systems can generally be integrated together in a single software product or packaged into multiple software products.

Particular implementations of the subject matter have been described. Other implementations are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method for resolving an incident associated with a software system, the method comprising:
   receiving, by the one or more processors, an image representing a screenshot associated with the incident occurring within the software system;
   processing, by the one or more processors, the image to generate a vector, the vector comprising features representative of the image, at least one feature representing one of more keywords of the image, processing the image comprising:
      providing the image for processing through an image model, the image model providing an initial set of features, each feature in the initial set of features being representative of the image,
      determining the at least one feature representing one of more keywords of the image, and
      adding the at least one feature of the initial set of features to provide a set of features, the vector comprising the set of features;
   comparing, by the one or more processors, the vector to a set of known vectors to provide a result, each known vector being associated with at least one solution for resolving a known incident;
   identifying, by the one or more processors, a solution of a plurality of solutions based on the result; and
   transmitting, by the one or more processors, data representation of the solution to a customer, the customer having transmitted the image.

2. The method of claim 1, wherein the at least one feature representing one of more keywords of the image is determined by processing the image to provide text data, and processing the text data to determine a set of keywords, the at least one feature being provided based on the set of keywords.

3. The method of claim 2, wherein the at least one feature is determined as a numerical value based on one or more scores of keywords in the set of keywords.

4. The method of claim 1, wherein comparing the vector to a set of known vectors to provide a result comprises calculating a similarity score between the vector and each known vector in the set of known vectors to provide a set of similarity scores, each similarity score representing a similarity between the vector and a respective known vector.

5. The method of claim 4, wherein identifying a solution of a plurality of solutions based on the result comprises identifying the solution as being associated with the known vector having a highest similarity score.

6. The method of claim 1, wherein transmitting data representation of the solution to a customer comprises receiving solution data from a solution database, the solution data comprising one or more of text data, image data, audio data, and video data, and transmitting the solution data to a computing device of the customer.

7. A non-transitory computer-readable storage medium coupled to one or more processors and having instructions stored thereon which, when executed by the one or more processors, cause the one or more processors to perform operations for resolving an incident associated with a software system, the operations comprising:
   receiving an image representing a screenshot associated with the incident occurring within the software system;
   processing the image to generate a vector, the vector comprising features representative of the image, at least one feature representing one of more keywords of the image, processing the image comprising:
      providing the image for processing through an image model, the image model providing an initial set of features, each feature in the initial set of features being representative of the image,
      determining the at least one feature representing one of more keywords of the image, and
      adding the at least one feature of the initial set of features to provide a set of features, the vector comprising the set of features;
   comparing the vector to a set of known vectors to provide a result, each known vector being associated with at least one solution for resolving a known incident;
   identifying a solution of a plurality of solutions based on the result; and
   transmitting data representation of the solution to a customer, the customer having transmitted the image.

8. The computer-readable storage medium of claim 7, wherein the at least one feature representing one of more keywords of the image is determined by processing the image to provide text data, and processing the text data to determine a set of keywords, the at least one feature being provided based on the set of keywords.

9. The computer-readable storage medium of claim 8, wherein the at least one feature is determined as a numerical value based on one or more scores of keywords in the set of keywords.

10. The computer-readable storage medium of claim 7, wherein comparing the vector to a set of known vectors to provide a result comprises calculating a similarity score between the vector and each known vector in the set of known vectors to provide a set of similarity scores, each similarity score representing a similarity between the vector and a respective known vector.

11. The computer-readable storage medium of claim 10, wherein identifying a solution of a plurality of solutions based on the result comprises identifying the solution as being associated with the known vector having a highest similarity score.

12. The computer-readable storage medium of claim 7, wherein transmitting data representation of the solution to a customer comprises receiving solution data from a solution database, the solution data comprising one or more of text data, image data, audio data, and video data, and transmitting the solution data to a computing device of the customer.

13. A system, comprising:
one or more computers; and
a computer-readable storage device coupled to the computing device and having instructions stored thereon which, when executed by the computing device, cause the computing device to perform operations for resolving an incident associated with a software system, the operations comprising:
receiving an image representing a screenshot associated with the incident occurring within the software system;
processing the image to generate a vector, the vector comprising features representative of the image, at least one feature representing one of more keywords of the image, processing the image comprising:
providing the image for processing through an image model, the image model providing an initial set of features, each feature in the initial set of features being representative of the image,
determining the at least one feature representing one of more keywords of the image, and
adding the at least one feature of the initial set of features to provide a set of features, the vector comprising the set of features;
comparing the vector to a set of known vectors to provide a result, each known vector being associated with at least one solution for resolving a known incident;
identifying a solution of a plurality of solutions based on the result; and
transmitting data representation of the solution to a customer, the customer having transmitted the image.

14. The system of claim 13, wherein the at least one feature representing one of more keywords of the image is determined by processing the image to provide text data, and processing the text data to determine a set of keywords, the at least one feature being provided based on the set of keywords.

15. The system of claim 14, wherein the at least one feature is determined as a numerical value based on one or more scores of keywords in the set of keywords.

16. The system of claim 13, wherein comparing the vector to a set of known vectors to provide a result comprises calculating a similarity score between the vector and each known vector in the set of known vectors to provide a set of similarity scores, each similarity score representing a similarity between the vector and a respective known vector.

17. The system of claim 16, wherein identifying a solution of a plurality of solutions based on the result comprises identifying the solution as being associated with the known vector having a highest similarity score.

* * * * *